(12) United States Patent
Rice et al.

(10) Patent No.: US 8,794,293 B2
(45) Date of Patent: Aug. 5, 2014

(54) SINGLE DOSE APPLICATOR AND METHOD

(75) Inventors: William J. Rice, Antioch, IL (US);
Thomas W. Otis, Roxbury, NY (US);
Michael E. Klinkhammer, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 477 days.

(21) Appl. No.: 12/853,362

(22) Filed: Aug. 10, 2010

(65) Prior Publication Data

US 2012/0037301 A1 Feb. 16, 2012

(51) Int. Cl.
*B32B 37/10* (2006.01)
*B32B 37/12* (2006.01)
*B32B 37/26* (2006.01)
*B29C 65/52* (2006.01)

(52) U.S. Cl.
USPC ............ 156/578; 156/574; 156/575; 156/579

(58) Field of Classification Search
USPC .................. 156/247, 289, 574, 575, 578, 579
See application file for complete search history.

(56) References Cited

U.S. PATENT DOCUMENTS

| | | | |
|---|---|---|---|
| 2,657,998 A * | 11/1953 | Peters | 426/119 |
| 3,386,793 A | 6/1968 | Stanton | |
| 3,860,348 A | 1/1975 | Doyle | |
| 4,254,871 A | 3/1981 | Poore | |
| 4,362,000 A | 12/1982 | Poore | |
| 4,728,380 A * | 3/1988 | Jones et al. | 156/230 |
| 4,759,816 A * | 7/1988 | Kasper et al. | 156/235 |
| 4,963,045 A | 10/1990 | Willcox | |
| 5,019,346 A | 5/1991 | Richter et al. | |
| 5,219,238 A * | 6/1993 | Hainbach | 401/52 |
| 5,312,624 A | 5/1994 | Richter et al. | |
| 5,393,032 A * | 2/1995 | Cederroth | 249/61 |
| 5,498,455 A * | 3/1996 | Roberts | 428/41.8 |
| D436,532 S | 1/2001 | Richardson | |
| 6,499,597 B2 | 12/2002 | Edwards et al. | |
| D479,097 S | 9/2003 | Willis | |
| 6,667,286 B1 | 12/2003 | Dettinger et al. | |
| 7,108,440 B1 | 9/2006 | Gruenbacher et al. | |

(Continued)

FOREIGN PATENT DOCUMENTS

| EP | 0350661 A | * | 1/1990 |
|---|---|---|---|
| EP | 2141221 A1 | | 1/2010 |

(Continued)

OTHER PUBLICATIONS

English translation of GB1299869A; Gaunt (Dec. 1972).*

(Continued)

*Primary Examiner* — Sonya Mazumdar

(57) ABSTRACT

An applicator, related applicator system, and a method for delivering a self-adhesive material are provided. The applicator includes an outer surface, and an inner surface opposite the outer surface. The inner surface of the applicator defines a void that is operable to receive the self-adhesive material. At least a portion of the inner surface releasably adhere the applicator side of the self-adhesive material where the adhesive force between the portion of the inner surface and the applicator side being less than adhesive force between the substrate and the substrate side. The applicator is used by placing the applicator in contact with a substrate, pressing the applicator against the substrate such that the self-adhesive material adheres to the substrate, and releasing the applicator from the substrate.

27 Claims, 4 Drawing Sheets

(56) References Cited

U.S. PATENT DOCUMENTS

| | | |
|---|---|---|
| 7,243,798 B2 | 7/2007 | Buss |
| 7,448,496 B2 | 11/2008 | Williams-Hartman |
| 7,469,519 B2 | 12/2008 | Barthel et al. |
| 7,520,406 B2 | 4/2009 | Jaichandra et al. |
| 7,709,433 B2 * | 5/2010 | Veltman et al. ............... 510/191 |
| D623,798 S | 9/2010 | Huynh |
| 2002/0195369 A1 | 12/2002 | Bergman |
| 2004/0011693 A1 * | 1/2004 | Prenger et al. ............... 206/531 |
| 2004/0065679 A1 | 4/2004 | Peuker et al. |
| 2005/0274453 A1 * | 12/2005 | Anvar ............................ 156/247 |
| 2006/0213801 A1 | 9/2006 | Karaoren et al. |
| 2006/0260973 A1 | 11/2006 | Macinnes et al. |
| 2007/0053737 A1 | 3/2007 | Morris et al. |
| 2008/0003052 A1 | 1/2008 | Lee et al. |
| 2008/0057020 A1 | 3/2008 | Evers et al. |
| 2008/0058239 A1 | 3/2008 | Evers et al. |
| 2008/0058240 A1 | 3/2008 | Evers et al. |
| 2008/0058241 A1 | 3/2008 | Sarcinelli et al. |
| 2008/0092282 A1 | 4/2008 | Altmann et al. |
| 2008/0099041 A1 | 5/2008 | Evers et al. |
| 2008/0255017 A1 | 10/2008 | Dettinger et al. |
| 2008/0313795 A1 | 12/2008 | Lu |
| 2009/0188831 A1 | 7/2009 | Blackman |
| 2009/0194451 A1 | 8/2009 | Leiner et al. |
| 2009/0235443 A1 | 9/2009 | Arora et al. |
| 2010/0120648 A1 * | 5/2010 | Veltman et al. ............... 510/193 |
| 2013/0068267 A1 * | 3/2013 | Soller et al. .................... 134/201 |

FOREIGN PATENT DOCUMENTS

| | | |
|---|---|---|
| EP | 1901972 B1 | 3/2010 |
| EP | 2281756 A1 | 2/2011 |
| WO | WO03097947 A1 | 11/2003 |
| WO | WO2012017276 A1 | 2/2012 |
| WO | WO 2012021169 A1 * | 2/2012 |

OTHER PUBLICATIONS

English translation of JP2002128159 A; Osada et al. (May 2002).*
English translation of JP0958762A; Shirai (Jul. 1997).*
PCT/US2011/001411 International Search Report dated Nov. 30, 2011.

* cited by examiner

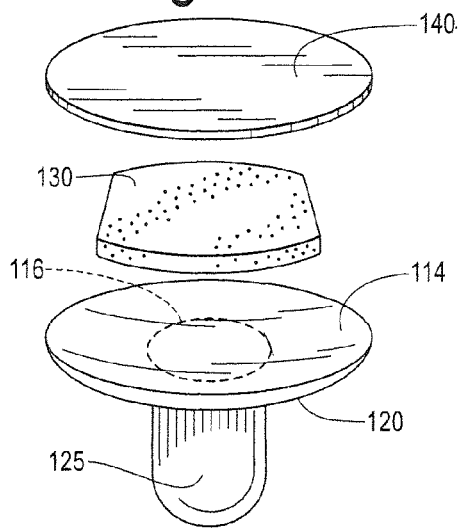
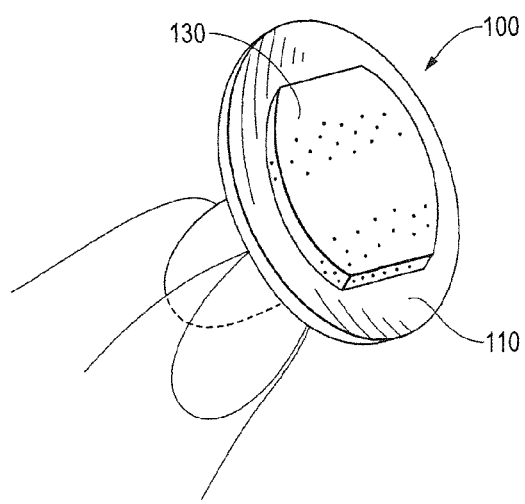
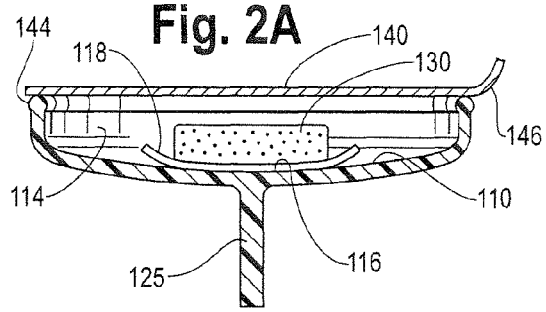
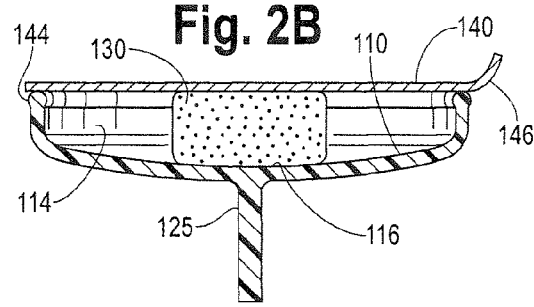
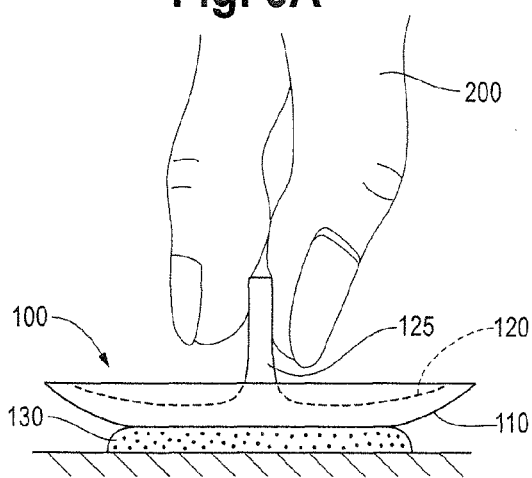
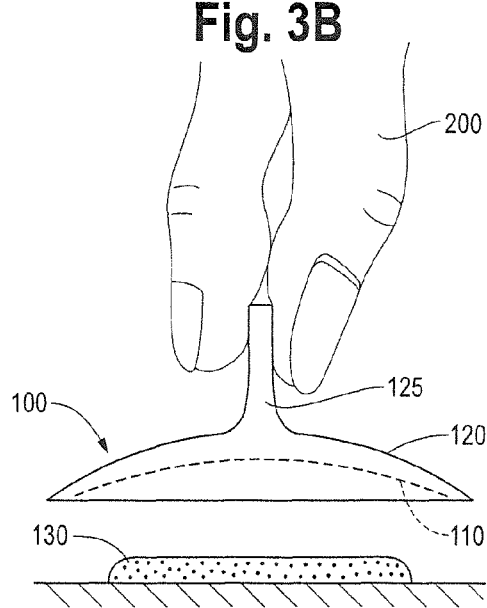

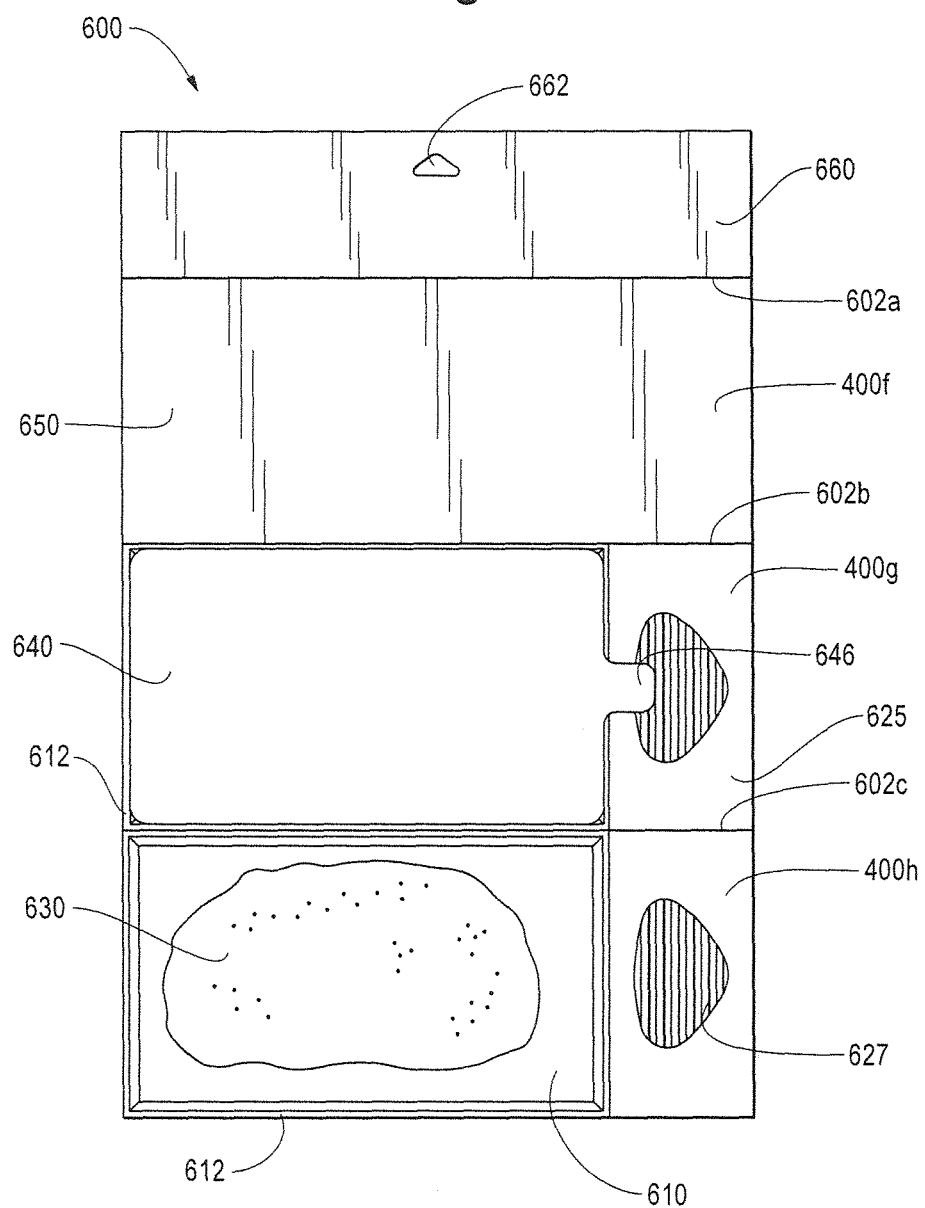

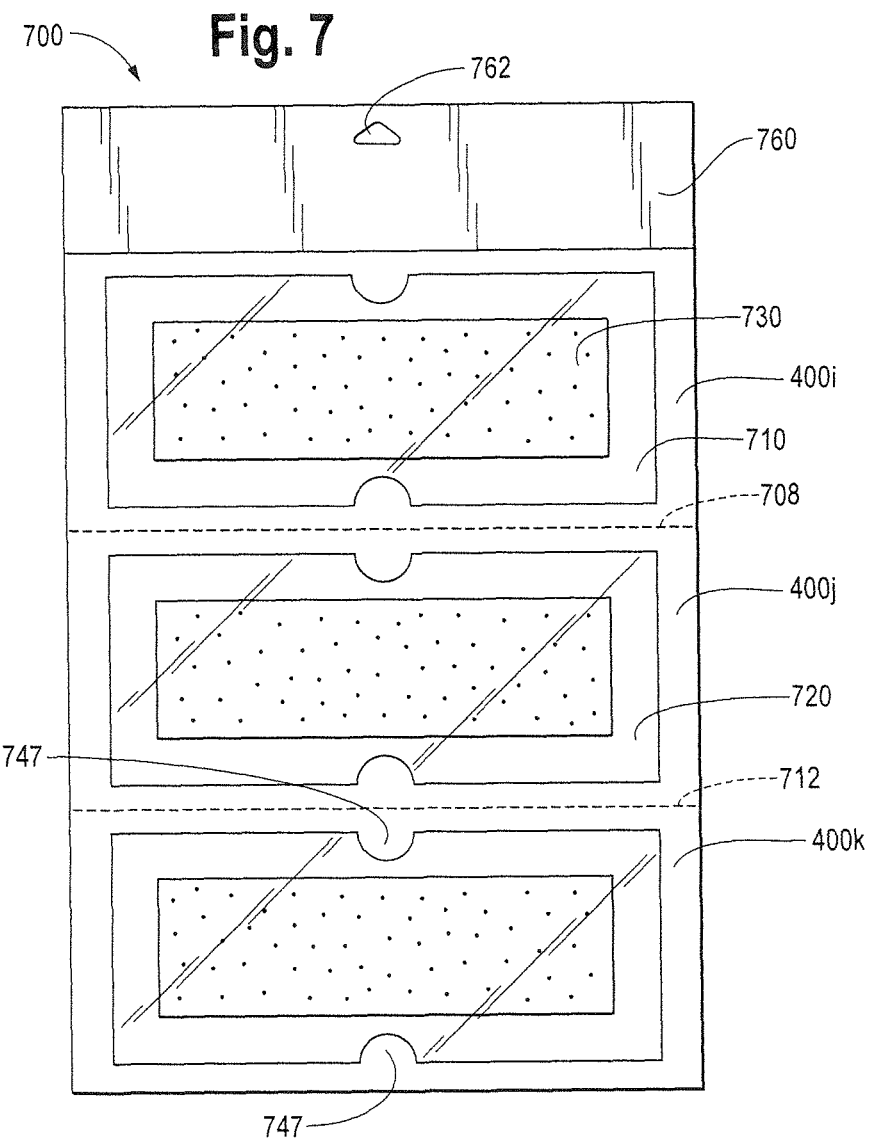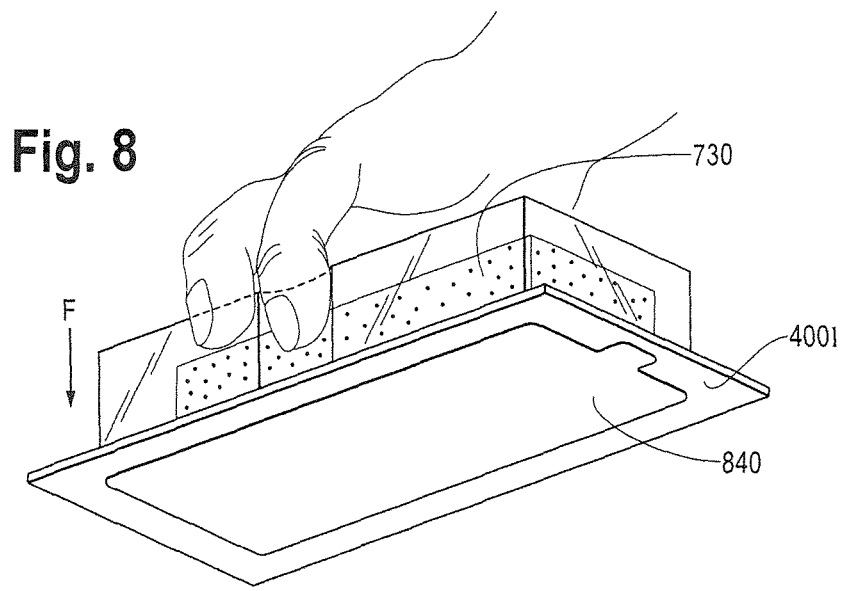

SINGLE DOSE APPLICATOR AND METHOD

TECHNICAL FIELD

The present invention generally relates to applicators and methods for delivering a self-adhesive material. More specifically, applicators and methods are provided for delivery of a self-adhesive, particularly the delivery of a single dose of a sanitary agent to a surface, such as the surface of a toilet.

BACKGROUND

Various agents for cleaning, sanitizing, and deodorizing surfaces of bathroom appliances such as toilets are known and have been widely available to consumers in the form of solids, pastes, gels, powders and liquids. Liquid formulations commonly delivered in squeeze bottles allow for periodic cleaning of the appliance, but require a consumer to reapply the sanitary agent each time the appliance is to be cleaned. Other products that demand less time by the consumer allow for automatic or continuous cleaning of the appliance. For example, automatic or continuous cleaning is afforded by providing sanitary agents in the form of solid blocks or by suspending the sanitary agent in baskets that hang from the appliance. The disadvantage of such modes of delivery is that to place the block or basket, the consumer is required to directly handle the sanitary agent or to directly contact an un-hygienic surface of the appliance.

Other agents such as self-adhesive materials adhere to substrates such as surfaces of bathroom appliances. For example, self-adhesive sanitary agents allow for direct application of the sanitary agent to a surface, and thus provide automatic or continuous cleaning of an appliance while overcoming the drawbacks of previous forms. Dispensers for self-adhesive materials and agents are cumbersome mechanical apparatus that contain an inventory of agent that can be delivered in a series of controlled unitized doses. The dispenser and initial inventory of agent represent an upfront investment for the consumer. Additionally, such dispensers can be difficult to properly operate and can waste product by leaving behind residual agent inventory after the device is used. Accordingly, there is a need for an applicator for the delivery of smaller or single doses of self-adhesive agents, that is easy to use and avoids the problems of more sophisticated complex multiple dose dispensers.

SUMMARY OF THE INVENTION

One aspect of the invention provides an applicator for delivering a self-adhesive material having an applicator side and a substrate side to a substrate. The applicator includes an outer surface, and an inner surface opposite the outer surface. The inner surface of the applicator defines a void that is operable to receive the self-adhesive material. At least a portion of the inner surface releasably adhere the applicator side of the self-adhesive material where the adhesive force between the portion of the inner surface and the applicator side being less than adhesive force between the substrate and the substrate side.

Another aspect of the invention provides an applicator system where the applicator has an outer surface, and an inner surface opposite the outer surface. The inner surface defines a void with a self-adhesive material having an applicator side and a substrate side disposed inside. A cover is removably attached to a rim that is disposed about a periphery of the void. At least a portion of the inner surface is operable to releasably adhere the applicator side of the self-adhesive material where the adhesive force between the portion of the inner surface and the applicator side being less than adhesive force between the substrate and the substrate side of the self-adhesive material.

In yet another aspect of the invention, a method of using an applicator for delivering a self-adhesive material to a surface is provided. The method comprises providing an applicator with a portion of an inner surface that releasably adheres the self-adhesive material; placing the applicator in contact with a substrate with the inner surface facing the substrate; pressing the applicator against the substrate to adhere the self-adhesive material to the substrate; and removing the applicator from the substrate.

BRIEF DESCRIPTION OF THE DRAWINGS

FIGS. 1A and 1B are an exploded view and illustration of an applicator for delivering a self-adhesive material to a substrate in accordance with the invention.

FIGS. 2A and 2B are cross-sectional views of an applicator having an inner surface that defines a void for holding a self-adhesive material in accordance with the invention.

FIGS. 3A and 3B are cross-sectional views of an applicator delivering self-adhesive material in accordance with the invention.

FIG. 6 illustrates hangable product packaging for use in providing self-adhesive materials that are delivered to a substrate in accordance with the invention.

FIG. 7 depicts another exemplary embodiment of a hangable product packaging for use in providing self-adhesive materials that are delivered to a substrate in accordance with the invention.

FIG. 8 depicts a process of using the hangable product packaging shown in FIG. 7.

DETAILED DESCRIPTION

Figure 4:
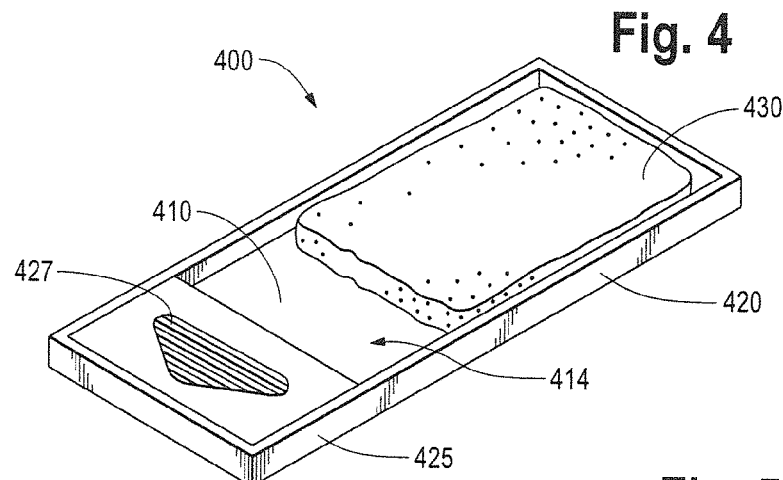
FIG. 4 is an illustration of an embodiment of an applicator for delivering a self-adhesive material to a substrate in accordance with the invention.

An applicator 100 having an inner surface 110 that defines a void 114 for holding a self-adhesive material 130 is shown in FIGS. 1A and 1B. The applicator includes an outer surface 120 and a void 114. As shown, in FIGS. 1A and 1B, the void 114 is formed by the inner surface 110 of the applicator. The outer surface and void elements can be individually formed to facilitate the handling and delivery of the self-adhesive material. As for the materials of construction, the applicator can be formed from either a single material or various different materials. For example, the outer surface can be made of a rigid material this is formed to facilitate the holding, moving, manipulating, and so forth of the applicator while the inner surface can be made of material designed for the holding and delivery of the self-adhesive material. In some embodiments the outer surface 120 may further include a handle 125. In one embodiment, the handle 125 extends essentially transversely from the outer surface 120, and as shown in FIG. 1A, is adapted to be grasped between a finger and thumb. Optionally, the outer surface 120 can be formed to include the optional handle 125. The handle 125 facilitates maneuvering of the applicator into position for delivery of the self-adhesive material 130 to the surface. Such a handle can be useful for the attaching self-adhesive material below a water line, such as in a toilet or tank of liquid. As shown in FIG. 1A, the outer surface 120, the inner surface 110, and the handle 125 are formed together as a single unitary device.

Generally, the void is an open-ended volume that is typically concave in shape so as to allow for the acceptance and delivery of a relatively small or single dose of self-adhesive material. Non-limiting examples of void shapes include relatively uniform geometric shapes such as a cylinder, polyhedron, sphere, ellipsoid, any rectilinear volume, and so forth The inner surface 110 has a portion 116 that is adapted to receive and adhere a self-adhesive material 130. Self-adhesive material 130 can be a paste, gel or the like that is adapted for applying directly to a substrate. In some embodiments, the self-adhesive material 130 may be a sanitary agent that may be used to clean, disinfect or odorize a substrate. The self-adhesive material 130 can sanitize the substrate by disintegrating and releasing cleaning, disinfecting and/or deodorizing substances when contacted with a rinse liquid. Examples of self-adhesive material 130 that may be delivered using the applicators of this invention are disclosed in U.S. Patent Application No. 2008/0190457, entitled "Self-sticking Disintegrating Block for Toilet or Urinal" to Veltman et al., published on Aug. 14, 2008; U.S. Patent Application No. 2009/0215661 entitled "Cleaning Composition Having High Self-Adhesion and Providing Residual Benefits" to Klinkhammer et al., published on Aug. 27, 2009; and U.S. Pat. No. 6,667,286 entitled "Adhesive sanitary agent" issued to Dettinger et al. on Dec. 23, 2003, the disclosures of which are incorporated herein by reference. As disclosed in the prior art, formulations of the self-adhesive material can include compositions that are detersive, cleansing, fragrancing, disinfecting, septic, corrosive, enzymatic, and so forth.

In one embodiment, the self-adhesive material attaches directly to a wall of a toilet bowl or urinal, either above or below the water-line and in the stream of flush water, by pressing the material to the wall. Accordingly, a non-limiting example of self-adhesive material includes 25% to 99% of surfactants, and 1% to 25% of a liquid component, wherein all percentages are percent by weight of the total composition of the material. The surfactants include one or more solid surfactants, and optionally one or more liquid surfactants. The surfactants may be anionic, nonionic, cationic and/or amphoteric depending on the cleaning properties desired. The liquid component may selected from water, surfactants, glycerin, fragrances, colorants, alcohols, binders, lime-scale removing agents, hydrotropes, solvents, chelating agents, dispersing agents, and mixtures thereof. The self-adhesive material may further include a filler. The self-adhesive material contains proportions of the above-identified ingredients such that the material has a mass that has a "sticky" consistency. Preferably, the material does not flow, i.e., the block is not viscous. The ratio of the two primary ingredients, the solid surfactant and the liquid component, depends on the liquid and its penetration (liquid absorption into the solid) and the solubility of the solid surfactant in the liquid(s). For a liquid fragrance, it is desirable to absorb more than solubilize. Although the addition of water is not preferred, small amounts can be tolerated.

Generally, self-adhesive material refers to any gel, paste, wax, solid, or the like that may adhere to, or otherwise provide a self-support from, a surface or substrate. By self-support, it is meant that a material will not require any additional device, or other mechanical means, to maintain and/or support and/or otherwise suspend the material in a fixed place, particularly in light of natural gravitational forces acting on the material. Substrates to which the self-adhesive material 130 can be delivered are numerous and diverse and can include hard surfaces that are both natural and man-made. In one embodiment the substrate is the surface of a toilet above the water line. For example, the self-adhesive sanitary material adheres to the side of a toilet bowl underneath the rim. Other non-limiting examples of surfaces to which self-adhesive material adheres can include a ceramic surface, such as a toilet bowl or a sink, glass, metal, plastic, stone, and so forth. Generally, self-adhesive material does not include a separate layer of glue which tends to leave an unwanted residue behind on the surface. Typically, the self-adhesive material is released from the surface by any number of physical and chemical processes such as being washed away, dissolved, devolatilized, vaporized, reacted, and so forth so as to leave no residue on the surface. For example, a self-adhesive sanitary material on an inner toilet bowl surface is washed away from a surface after being subject to one or more flushes.

Without being bound to any particular theory the relative strength of adhesive force between self-adhesive material and various substrates and surfaces is controlled by the magnitude of the inter-molecular forces of attraction, i.e., between the material and the surface or substrate. The higher the magnitude of this attraction, the greater will be the strength of the adhesive force. The magnitude of this attraction will depend upon (1) the nature of the molecules contained within the material and the surface or substrate and (2) the distance between the contacting material and the surface or substrate during use. In general, the closer the distance, the greater will be the magnitude of this attraction. Surface smoothness or roughness can affect attraction such that the required attraction can be adjusted by appropriate control of the rheology of the self-adhesive material. In other words, the viscoelastic properties of the material should fall within a certain range for the material to be effective. For example, a stiff or non-malleable material can result in air gaps between the material and the surface or substrate which effectively lowers adhesive force strength. Further, a fluid or soft material can flow, drip, or drain down the surface and prevent retention of a reasonable volume of the material within a desired area of the surface or substrate. Typically, the self-adhesive material is viscous semi-solid having viscoelastic properties that can be measured using a penetrometer and/or appropriate rheometric techniques. A "Stickiness Test" as described in U.S. Pat. application No. 2008/0190457 titled "Self-sticking Disintegrating Block for Toilet or Urinal" is another useful technique for determining optimal adhesive force to surfaces and other substrates. Once the various properties of the self-adhesive material are determined, a range can be established for the rheology of the material that can lead to good adhesion.

In one embodiment the adhesive properties of the self-adhesive material 130 are controlled such that adhesive force of the self-adhesive material 130 to the surface portion 116 is less than adhesive force of the self-adhesive material 130 to a substrate. In this way, portion 116 readily releases the self-adhesive material when self-adhesive material 130 comes in contact with a surface or a substrate such as the inside surface of a toilet bowel.

Referring to FIG. 1A, the inner surface 110 defines a void 114 for accepting the self-adhesive material 130 which adheres to the portion 116. As shown, the void formed by inner surface has a generally concave shape so the self-adhesive material 130 fits within the void. In one embodiment a cover 140 attaches to a periphery surrounding the void and seals the self-adhesive material within the void.

Optionally, indicia can be included on the various surfaces of the applicator and related components. The indicia can be used to convey a wide variety of information including, but not necessarily limited to, health, safety, environmental, use, brand identification and so forth.

Use of the applicator 100 as shown in FIG. 1B typically involves grasping the applicator 100 between a finger and thumb. With the cover 140 removed the self-adhesive material 130 is exposed within the void 110 and is ready to be delivered to a substrate. To position the applicator for delivery of the exposed self-adhesive material 130, a finger and thumb grasp handle 125 and maneuver the applicator 100 into contact with a substrate. Applicator 100 is positioned so that the self-adhesive material 130 can be brought into contact with the substrate. For example, the applicator can be used to deliver a single dose of the self-adhesive material to a surface of a toilet by placing the applicator 100 with self-adhesive material 130 in contact with the surface of the toilet above a water line.

Cross-sectional views of an applicator 100 having a portion 116 of inner surface 110 for holding a self-adhesive material 130 are shown in FIGS. 2A and 2B. In yet another embodiment, the inner surface 110 includes a rim 144 that encircles the void 114 formed by inner surface 110. The rim 144 is designed to facilitate removable attachment of the cover 140 to the rim 144 so as to enclose the self-adhesive material 130. The cover 140 protectively seals the self-adhesive material 130 inside the void 114. Prior to use of the applicator the cover 140 is detached from the rim 144 to expose the self-adhesive material 130 disposed in void 114. Cover 140 is made from material that provides a barrier against moisture and odor or fragrance. Typically the cover 140 is made of multilayer foil, a metalized barrier film such as a metal foil for example aluminum foil, plastic film, or combinations thereof. Examples of polymers used to form plastic films include, but are not limited to, polyethylene, polypropylene, polyethylene terephthalate, polybutylene terphthalate, polyethylene naphthalate, polyesters, polycarbonates, polystyrene, acrylics, polyurethanes, polyvinyl chloride, polyvinyl fluoride, and mixtures and copolymers thereof. In one embodiment, the cover 140 can be formed to have a tab 146 that can used to facilitate the removal of the cover.

A non-limiting example of material used to form or make the applicator 100 and related components such as the cover 140 can also include biodegradable or other environmentally compatible materials. The applicator components can be made of single-layer sheets or multi-layer laminate sheets such as the combination of barrier foil with plastic. Optionally, the materials can be transparent, translucent, or opaque as deemed desirable for various product supply, packaging, marketing, and various other business considerations. A non-limiting example of material includes heat sealable thermoplastic materials such as polyethylene or polypropylene. Layered laminates having generally a sandwich construction can include any combination or order of polyethylene, cellophane, paper, polyester, and so forth including variations there of. Selection of materials, and the thickness thereof, is determined by the nature of the material being packaged. The selection of biodegradable materials generally includes consideration of decomposition in both natural aerobic and anaerobic environments. More specifically for plastics material, biodegradability is achieved by materials that can be metabolized by microorganisms into inert material having minimal impact on the environment. For biodegradation in an aerobic environment a plastic can be selected based on ASTM D6400-04 Standard Specification for Compostable Plastics, ASTM D6868-03 Standard Specification for Biodegradable Plastics Used as Coatings on Paper and Other Compostable Substrates, and the ASTM D7081-05 Standard Specification for Non-Floating Biodegradable Plastics in the Marine Environment. For biodegradation in an anaerobic environment a plastic can be selected based on ASTM D5511-02 Standard Test Method for Determining Anaerobic Biodegradation of Plastic Materials Under High-Solids Anaerobic-Digestion Conditions or ASTM D5526-94 (2002) Standard Test Method for Determining Anaerobic Biodegradation of Plastic Materials Under Accelerated Landfill Conditions.

In addition, biodegradable or other environmentally compatible materials can include water-soluble material. Without being limited by any particular theory, water-soluble materials are materials that disintegrate or dissolve in the presences of water. Non-limiting examples of water-soluble material include, but is not necessarily limited to water-soluble polymers, particularly polymers that are useful in film forming, such as poly-vinyl alcohol, cellulose ether, and so forth either individually or in various combinations. As generally known in the art, various additives can be incorporated into the water-soluble polymers to alter disintegration and dissolution as desired.

In one embodiment and as shown in FIG. 2B, the cover 140 protectively seals the substrate surface of the self-adhesive material 130. Such protection is desirable when the environment affects the adhesive properties of the self-adhesive material such as the loss of adhesive force due to oxidation, moisture, and so forth. For such a cover, it is desirable that the adhesive force of the self-adhesive material 130 to the cover 140 be less than the adhesive force of the self-adhesive material 130 to the surface portion 116. In this way, cover 140 may be detached from the rim 144 such that the self-adhesive material 130 remains in the void 114.

In another embodiment, surface portion 116 is optionally the surface a of release layer 118 that is attached to the inner surface 110. In this way, the optional release layer 118 can be used to control adhesive force of the self-adhesive material 130. If the properties of the inner surface do not allow proper adhesive force with the self-adhesive material, the release layer 118 can be attached to the inner surface to provide a surface portion 116 that allows for the desired adhesive force with the self-adhesive material 130. For example, the optional release layer 118 may be made of a wax paper, silicone coated paper, and so forth that is glued to the inner surface 110.

Optionally, the release layer 118 can be formed to release from the inner surface 110 and remain attached to the self-adhesive material 130 when the self-adhesive material is applied to the hard surface. In such an embodiment, the release layer 130 can provide a protective layer or backing for the self-adhesive material until the appliance with the hard surface is put into use such as by flushing in the case of a toilet. When used in this manner, the release layer 118 is desirably formed of biodegradable or other environmentally compatible materials. More specifically, the release layer can be formed from water-soluble material as describe herein which upon contact with water, such as through flushing, will dissolve or disintegrate to fully expose the self-adhesive material.

In yet another embodiment, the adhesive properties of the portion 116 are controlled by the use of a coating to modify the adhesive properties of the portion 116. Thus, coatings can be used to control adhesive force. For example, application of silicone to the portion 116 reduces adhesive force and makes the self-adhesive material easier to release from the applicator.

Cross-sectional views of an applicator 100 delivering self-adhesive material 130 to a surface are as shown in FIGS. 3A and 3-B. As described above, the void 114 has a general concave shape. In one embodiment, the concave shape can be in the form of a deformable resilient shape of a dome and sidewalls. Such a shape easily deforms when force is applied and then recovers to its original profile when the force is removed. Material useful in the making such a deformable applicator 100 include deformable resilient material, such as flexible or rigid plastic including, but not limited to, thermoformed plastic.

To use the applicator for the delivery of self-adhesive material 130 to a surface, the cover 140 is removed to expose the self-adhesive material. As shown in FIG. 3A the exposed self-adhesive material is positioned against a substrate by moving the applicator in a direction which is substantially normal to the substrate. Appropriate pressure is applied to facilitate any required deformation of the applicator surfaces and the adhesion of self-adhesive material 130 to the substrate. When an optional handle 125 is available it can be grasped between a finger and thumb to help steady the applicator as it is being pressed against the substrate. As the applicator 100 is pressed against the substrate, the surfaces that define the normally concave void 114 deform so as to allow contact of the self-adhesive material with the substrate or surface. Because the adhesive force to the substrate or surface is greater than the adhesive force to surface portion 116, the self-adhesive material is released from the applicator 100. The surface portion 116 is optimally designed to facilitate release of self-adhesive material 130. The surface portion 116 can be designed and formed based on adhesive properties of the self-adhesive material so that less force is demanded to separate the self-adhesive material 130 from the surface portion 116 than to separate the self-adhesive material 130 from the substrate. Optimally, when the self-adhesive material 130 is brought into simultaneous contact with both the surface portion 116 and a substrate surface, and force is applied to remove the applicator 100 from the substrate surface, the self-adhesive material 130 is released from the surface portion 116, as illustrated in FIG. 3B. In some embodiments, upon release of self-adhesive material 130, the applicator 100 resumes its original profile with inner surface 110 forming a void 114 having a generally concave shape. Self-adhesive material 130 remains in contact with the substrate and is left behind on the substrate when applicator 100 is pulled away in a direction which is substantially normal to the substrate. The self-adhesive material 130 is held in place on the substrate by its adhesive properties.

An embodiment of an applicator 400 for delivering a self-adhesive material to a substrate is as shown in FIG. 4. The applicator 400 has an inner surface 410 that defines a void 414 for holding a self-adhesive material 430. The applicator includes an outer surface 420 which along with the void can be individually formed to facilitate the handling and delivery of the self-adhesive material. The applicator can be formed from either a single material or various different materials. For example, the outer surface can be made of a rigid material this is formed to facilitate the holding, moving, manipulating, and so forth of the applicator while the inner surface can be made of material designed for the holding and delivery of the self-adhesive material. In some embodiments a portion of the applicator extends essentially laterally from the outer surface 420 so as to for a handle 425 which can be adapted to be grasped between a finger and thumb. In one embodiment, the handle 425 can include texturing 427 on either side to facilitate grasping the applicator. Optionally, the outer surface 420 of the applicator can be formed to accommodate the optional handle 425. The handle 425 facilitates maneuvering of the applicator into position for delivery of the self-adhesive material 430 to the surface. Such a handle can be useful for the attaching self-adhesive material to the inside surface of a toilet or generally and container that holds. As shown in FIG. 4, the outer surface 420, the inner surface 410, and the handle 425 are formed together as a single unitary device.

The inner surface 410 has a portion (not shown) that is adapted to receive and adhere a self-adhesive material 430. Self-adhesive material 430 can be a paste, gel or the like that is adapted for applying directly to a substrate. In some embodiments, the self-adhesive material 430 may be a sanitary agent that may be used to clean, disinfect or odorize a substrate. The self-adhesive material 430 can sanitize the substrate by disintegrating and releasing cleaning, disinfecting and/or deodorizing substances when contacted with a rinse liquid. In one embodiment the adhesive properties of the self-adhesive material 430 are controlled such that adhesive force of the self-adhesive material 430 to a surface portion (not shown) is less than adhesive force of the self-adhesive material 430 to a substrate. In this way, surface portion (not shown) readily releases the self-adhesive material when self-adhesive material 430 comes in contact with a surface or a substrate such as the inside surface of a toilet bowel.

Generally, the inner surface 410 defines a void 414 for accepting the self-adhesive material 430 which adheres to a portion (not shown) of the inner surface. The void formed by inner surface has a generally concave shape so the self-adhesive material 430 fits within the void. In some embodiments as shown in FIG. 5A, a cover 540 attaches to a periphery surrounding the void and seals the self-adhesive material within the void.

Use of the applicator 400 typically involves grasping the applicator 400 by the handle 425 between a finger and thumb. Any cover over the void is removed so as to expose the self-adhesive material 430 within the void 410 for delivery to a substrate. To position the applicator for delivery of the exposed self-adhesive material 430, a finger and thumb grasp handle 425 and maneuver the applicator 400 into contact with a substrate. Applicator 400 is positioned so that the self-adhesive material 430 can be brought into contact with the substrate. Optionally, while grasping the handle 425 of the applicator with a thumb and finger, a free finger on either hand can press on the outer surface 420 opposite the self-adhesive material to deform the applicator as required so that the self-adhesive material comes in contact with the substrate. For example, the applicator can be used to deliver a single dose of the self-adhesive material to a surface of a toilet by placing the applicator 400 with self-adhesive material 430 in contact with the surface of the toilet above a water line.

Figure 5A:
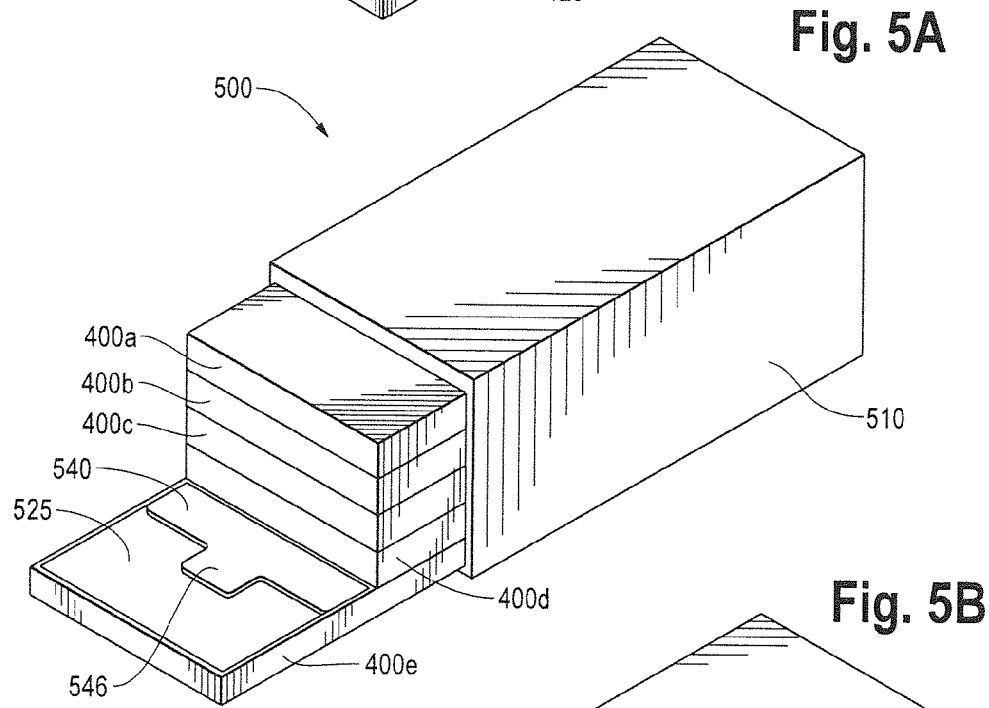
FIGS. 5A and 5B are illustrations of product packaging for use in providing self-adhesive materials that are delivered to a substrate in accordance with the invention.
Figure 5B:
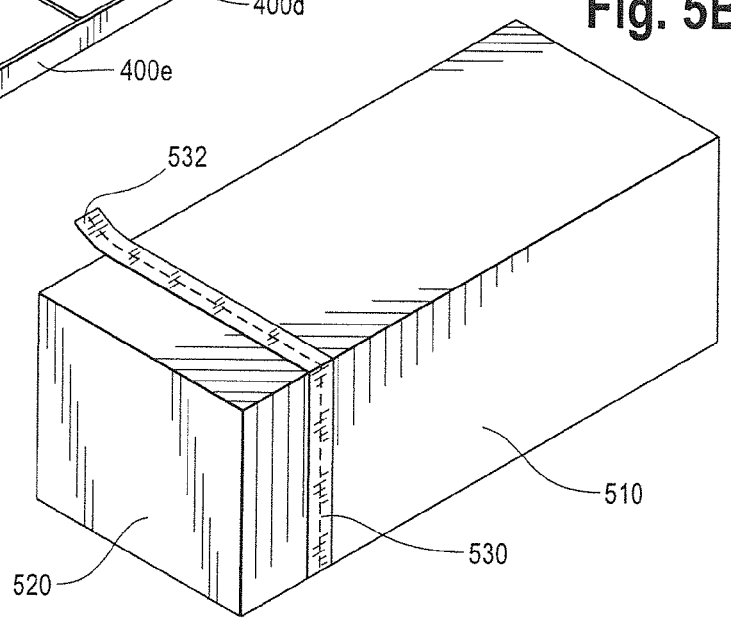

An example of product packaging for use in providing self-adhesive materials that are delivered to a substrate is as shown in FIGS. 5A and 5B. A plurality of applicators 400a-e for delivering a self-adhesive material can be combined in a single package as desired to meet marketing and customer need for convenience and cost. For example, product package 500 that holds multiple applicator in a fashion similar to a pack of chewing gum. Once opened the residual portion of the product package forms a container 510 that holds any remaining applicators while allowing for the easy removal of individual applicators. As generally known for typical consumer products, an end 520 of the product package is designed for easy and convenient removal so as to expose the plurality of applicators 400a-e. Again as commonly known in the art the products package 500 can include a perforated portion 530 and underlying pull tab 532 which can be used to "open" the product package by facilitating the removal of end 520. Once the end 530 is removed individual applicators can slide out of the product package 500 as is being exhibited by applicator 400e.

As shown in FIG. 5A, the applicator 400e can include a handle 525. Besides being useful during application of the self-adhesive material to a substrate as described above, such a handle can be used to facilitate the removal of an applicator such as 400e from the container 510. By grasping and pulling on the handle 525, the applicator 400e can be withdrawn from the container 510. Optionally, the applicators, such as 400e, can include a cover 540 that can used to protect the contained self-adhesive material. The cover can be formed to have a tab 546 which is to be used to help remove the cover 540. In another embodiment, the outer surface of the adjacent applicator can function as a cover.

In yet another embodiment of applicator packaging, hangable product packaging 600 for use in providing self-adhesive materials that are delivered to a substrate is as shown in FIG. 6. In this embodiment, a plurality of applicators 400f-h for delivering a self-adhesive material can be combined in a single package as desired to meet marketing and customer need for convenience and cost. In this embodiment, hangable product packaging 600 is designed to contain multiple applicators that are removably attached to one another in series. This type of hangable product packaging can include a tab 660 having aperture 662 for use in supporting hangable product packaging 600 form a marketing display or storage support such as by a peg, rod, nail, and so forth. As generally known for typical consumer products, the tab 600 and the applicators 400f-g are attached sequentially in series via separable connections 602a-c. For example, the connections can include a series of perforations or serrations, which allow each applicator to be serially removed from the hangable product packaging.

For illustration purposes the details of each of the applicators 400f-h are shown each individually and each with distinct view of the applicator. In actual use, the hangable product packaging would provide all the applicators in a closed and sealed form as common known for consumer products. In any case, each applicator includes a self-adhesive material 630 which is contained in a void 610. A cover 640 that attached to rim 612 can cover and protect the self-adhesive material in the void 610 and can have a tab 646. The applicator can include a handle 625 with optional gripping 627 that among other functions can be useful during the separation of an applicator from the hangable product packaging 600. Further and as commonly known in the supply of products, the hangable product packaging 600 can include optional protective layer 650 that surrounds and protects either individual or multiple applicators.

A non-limiting example of material used to form the various embodiments of the product packaging can includes biodegradable or other environmentally compatible materials include water-soluble materials as described above for use with the applicator. Optionally, the product packaging materials can be transparent, translucent, or opaque and can be constructed from single-layer sheets or multi-layer laminate sheets as deemed desirable based on a variety of considerations related to product supply, packaging, marketing, business needs, and so forth.

FIG. 7 provides an exemplary alternative to the embodiment shown in FIG. 6. In this example, the applicator packaging may be provided in a hangable product packaging 600 for use in providing self-adhesive materials that are delivered to a substrate. In this embodiment, a plurality of applicators 400i-k for delivering a self-adhesive material 730 can be combined in a single package as desired to meet marketing and customer need for convenience and cost. In this embodiment, hangable product packaging 700 is designed to contain multiple applicators that are removably attached to one another in series. For example, in the embodiment shown in FIG. 7, the individual applicators may be separated by perforations 708 between the applicators. This type of hangable product packaging can include a tab 760 having aperture 762 for use in supporting hangable product packaging 700 form a marketing display or storage support such as by a peg, rod, nail, and so forth.

For illustration purposes the details of each of the applicators 400i-k are shown each individually and each with distinct view of the applicator. In actual use, the hangable product packaging would provide all the applicators in a closed and sealed form as common known for consumer products. In any case, each applicator includes a self-adhesive material 730 which is contained in a void 710. A cover 740 that attached to rim 712 can cover and protect the self-adhesive material in the void 710 and can have one or more gripping areas 747 along the edge of the cover 740. In the embodiment shown in FIG. 7, the gripping areas 747 may be recesses that may accommodate the finger of a user. A surprising benefit of providing such gripping areas 747 is that the user may be able to place her finger(s) into the gripping areas 747, such as a thumb and middle finger and secure the adhesive material 730 and then use her index finger to engage the outer surface 720 and apply force, F, to effectively "press" the adhesive material 730 onto whichever surface she desires. Such a process is shown in FIG. 8 with the addition that an applicator 400l is provided with a removable material 840 on the underside of the applicator 400l that may be removed prior to engaging the material onto a surface (not shown). The removable material may be a foil that is adhered onto the underside of the applicator 400l that secures the adhesive material 730 within the void of the applicator 400l during storage, transport, etc.

While preferred embodiments and example configurations of the invention have been herein illustrated, shown and described, it is to be appreciated that various changes, rearrangements and modifications may be made therein, without departing from the scope of the invention as defined by the appended claims. It is intended that the specific embodiments and configurations disclosed are illustrative of the preferred and best modes for practicing the invention, and should not be interpreted as limitations on the scope of the invention as defined by the appended claims; it is to be appreciated that various changes, rearrangements and modifications my be made therein, without departing from the scope of the invention as defined by the appended claims.

The invention claimed is:

1. An applicator for delivering a self-adhesive material to a substrate, the self-adhesive material having an applicator side and a substrate side the applicator comprising:
    an outer surface; and
    an inner surface opposite the outer surface, the inner surface defining a void operable to receive the self-adhesive material;
    wherein at least a portion of the inner surface of the applicator is operable to releasably adhere to the applicator side of the self-adhesive material to define an adhesive force between the portion of the inner surface and the applicator side of the self-adhesive material and wherein the adhesive force between the portion of the inner surface and the applicator side of the self adhesive material is less than an adhesive force between the substrate and the substrate side of the self-adhesive material; and
    wherein a peripheral portion of the applicator is configured to flex away from self-adhesive material and substrate, and an inner portion of the applicator is configured to flex inward, in response to the applicator and adhesive material being pressed against the substrate;
    wherein the inner surface is configured to release the self-adhesive material in response to the applicator being moved in a direction that is away from and substantially normal to the substrate.

2. The applicator of claim 1, wherein the void has a periphery and the applicator further comprises a rim disposed about the periphery of the void.

3. The applicator of claim 1, further comprising a release layer positioned between the inner surface and the applicator side of the material, the release layer remaining attached to the material when the material gets attached to the substrate and is removed from the applicator.

4. The applicator of claim 2, further comprising a cover removably attached to the rim.

5. The applicator of claim 4, wherein the substrate side of the self-adhesive material is releasably adherable to the cover.

6. The applicator of claim 5, wherein the adhesive force between the self-adhesive material and the portion of the inner surface is greater than an adhesive force between the self-adhesive material and the cover.

7. The applicator of claim 1, wherein the inner surface forms a generally concave shape.

8. The applicator of claim 1, wherein the applicator comprises a deformable resilient material.

9. The applicator of claim 8, wherein the deformable resilient material is a thermoformed flexible plastic.

10. The applicator of claim 1, further comprising a handle integrally formed with the outer surface to provide a one-piece unitary body.

11. The applicator of claim 1, further comprising a coating on the portion of the inner surface.

12. An applicator system comprising:
an applicator comprising an outer surface; an inner surface opposite the outer surface, the inner surface defining a void, and a rim disposed about a periphery of the void;
a self-adhesive material, the material having an applicator side and a substrate side, disposed within the void; and
a cover removably attached to the rim of the applicator;
wherein at least a portion of the inner surface of the applicator is operable to releasably adhere to the applicator side of the self-adhesive material with adhesive force and wherein the adhesive force between the portion of the inner surface and the applicator side is less than an adhesive force between the substrate and the substrate side; and
wherein the self-adhesive material and the applicator define at least one gap, wherein a peripheral portion of the applicator flexes away from the self-adhesive material and substrate in response to the applicator and self adhesive material being pressed against the substrate.

13. The applicator system of claim 12, further comprising a release layer positioned between the inner surface and the applicator side of the self-adhesive material, the release layer remaining attached to the self-adhesive material when the self-adhesive material gets attached to the substrate and is removed from the applicator.

14. The applicator system of claim 12, wherein the substrate side of the self-adhesive material is releasably adherable to the cover.

15. The applicator system of claim 14, wherein the adhesive force between the self-adhesive material and the portion of the inner surface is greater than an adhesive force between the self-adhesive material and the cover.

16. The applicator system of claim 12, wherein the inner surface forms a generally concave shape.

17. The applicator system of claim 12, wherein the applicator comprises a deformable resilient material.

18. The applicator system of claim 17, wherein the deformable resilient material is a thermoformed flexible plastic.

19. The applicator system of claim 12, further comprising a handle integrally formed with the outer surface to provide a one-piece unitary body.

20. The applicator system of claim 12, further comprising a coating on the portion of the inner surface.

21. The applicator system of claim 12, wherein a composition of the self-adhesive material is selected from the formulations consisting of: detersive, cleansing, fragrancing, disinfecting, septic, corrosive, enzymatic, or combinations thereof.

22. The applicator of claim 1, wherein the applicator is formed of a water soluble material.

23. The applicator of claim 10, wherein the handle extends upwardly and outwardly from a central portion of the outer surface and is configured to be grasped between a finger and thumb of a user.

24. The applicator of claim 23, wherein the void is sized to receive and stow only a single dose of the self-adhesive material.

25. The applicator of claim 1 wherein the applicator comprises a deformable resilient material.

26. The applicator system of claim 12 wherein the rim of the applicator defines an inner perimeter and the self-adhesive material defines an outer perimeter and wherein the inner perimeter dimension of the rim is greater than the outer perimeter dimension of the self-adhesive material to form the at least one gap.

27. The applicator system of claim 12 wherein the rim to the outer surface of the applicator defines a first axial dimension and the substrate side of the self-adhesive material to the outer surface of the applicator defines a second axial dimension when located in the void of the applicator and wherein the first axial dimension is greater than the second axial dimension to form the at least one gap.

* * * * *